United States Patent
Tani et al.

(10) Patent No.: US 8,239,411 B2
(45) Date of Patent: Aug. 7, 2012

(54) IMAGE PROCESSOR

(75) Inventors: Yujiro Tani, Osaka (JP); Kazuyuki Takahashi, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 133 days.

(21) Appl. No.: 12/759,028

(22) Filed: Apr. 13, 2010

(65) Prior Publication Data

US 2010/0293171 A1    Nov. 18, 2010

(30) Foreign Application Priority Data

May 13, 2009    (JP) ................... 2009-116991

(51) Int. Cl.
*G06F 17/30* (2006.01)
(52) U.S. Cl. ........ 707/791; 707/802; 707/822; 707/808; 362/163; 362/164; 362/167
(58) Field of Classification Search .......... 707/600–831; 382/162–167
See application file for complete search history.

(56) References Cited

U.S. PATENT DOCUMENTS

2001/0012398 A1 * 8/2001 Todoroki ................ 382/166

OTHER PUBLICATIONS

"HD Photo—Photographic Still Image File Format", Nov. 7, 2006, Microsoft Corporation, http://www.microsoft.com/whdc/xps/hdphotodpk.mspx. (140 pages).
"Coding of Still Pictures—JBIG JPEG", Dec. 19, 2007, ISO/IEC JTC 1/SC 29/WG1 N 4392, http://www.itscj.ipsj.or.jp/sc29/open/29view/29n9026t.doc. (151 pages).
"Coding of Still Pictures—JBIG JPEG", Sep. 14, 2008, ISO/IEC JTC 1/SC 29/WG1 N 4739, http://www.itscj.ipsj.or.jp/sc29/open/29view/29n9749t.doc. (171 pages).

* cited by examiner

*Primary Examiner* — Isaac M Woo
(74) *Attorney, Agent, or Firm* — Oblon, Spivak, McClelland, Maier & Neustadt, L.L.P.

(57) ABSTRACT

A first sorting unit includes a second sorting unit that sorts first frequency data for luminance based on a first table, a third sorting unit that sorts second frequency data for chrominance based on a second table, a fourth sorting unit that sorts third frequency data for chrominance based on a third table, and an updating unit that updates the second and third tables based on nonzero information on the first and second frequency data before the third and fourth sorting units start sorting.

8 Claims, 5 Drawing Sheets

|   | 0  | 1  | 2  |
|---|----|----|----|
| 3 | 4  | 5  | 6  |
| 7 | 8  | 9  | 10 |
| 11| 12 | 13 | 14 |

FIG. 5B

TAY

| index | 2  | 1  | 3  | 0  | 8  | 10 | 4  | 6  | 5  | 7  | 12 | 13 | 9  | 11 | 14 |
|-------|----|----|----|----|----|----|----|----|----|----|----|----|----|----|----|
| count | 60 | 42 | 41 | 34 | 34 | 30 | 28 | 27 | 27 | 24 | 20 | 16 | 10 | 8  | 6  |

| 0 | 1 | 2 | 3 | 4 | 5 | 6 | 7 | 8 | 9 | 10 | 11 | 12 | 13 | 14 |

S4Y

| 2 | 1 | 3 | 0 | 8 | 10 | 4 | 6 | 5 | 7 | 12 | 13 | 9 | 11 | 14 |

FIG. 9

IMAGE PROCESSOR

CROSS-REFERENCE TO RELATED APPLICATIONS

This application claims priority to Japanese Patent Application No. 2009-116991. The entire disclosure of Japanese Patent Application No. 2009-116991 is hereby incorporated herein by reference.

BACKGROUND OF THE INVENTION

1. Field of the Invention

The present invention relates to an image processor.

2. Description of the Background Art

Microsoft Corporation has recently proposed HD Photo (or JPEG XR) as a still image file format that offers higher image quality than JPEG while requiring more simple circuit configuration and computation than JPEG 2000.

An encoder for HD Photo includes a color conversion unit, a pre-filter, a frequency transform unit, a quantization unit, a prediction unit, a sorting unit, and an encoding unit.

The frequency transform unit performs predetermined frequency transform (PCT) on an inputted pixel signal, so as to output frequency data (coefficient data) of highpass (hereinafter, "HP"), lowpass (hereinafter, "LP"), and direct current (hereinafter, "DC") components. One macroblock having 16 pixels in column×16 pixels in row includes 240 sets (15 sets×16 blocks) of frequency data of HP component, 15 sets of frequency data of LP component, and 1 set of frequency data of DC component for each of luminance Y, chrominance U, and chrominance V.

The quantization unit discards lower (or less significant) data equivalent to the number of digits defined by a quantization coefficient in the frequency data of each component inputted from the frequency transform unit, so as to output the frequency data after quantization (HP, LP, and DC components).

The prediction unit performs predetermined prediction on the frequency data inputted from the quantization unit, so as to output the frequency data after prediction (that is, difference data from a prediction value).

The sorting unit sorts (herein after, "Adaptive Scan") 15 sets of frequency data of LP component among the frequency data inputted from the prediction unit. The sorting unit also performs Adaptive Scan on 15 sets of frequency data of HP component among frequency data inputted from the prediction unit on a block-by-block basis. Specifically, the sorting unit refers to a table indicating frequency of appearance of nonzero data, and sorts the frequency data into the order of decreasing frequency of appearance of nonzero data. In HD Photo, there are three tables in total for the sorting unit to refer to in performing Adaptive Scan, one for LP component, one for HP component when orientation of prediction is a horizontal direction, and the other for HP component when orientation of prediction is a vertical direction.

The encoding unit splits the frequency data of each component inputted from the sorting unit into upper (or more significant) data (Normal Data) in an upper digit range and lower data (Flex Bits) in a lower digit range. Then the encoding unit performs entropy coding on the Normal Data of each component, and output the same, while outputting the Flex Bits of each component without entropy coding.

A decoder for HD Photo includes a color inverse conversion unit, a post-filter, a frequency inverse transform unit, a dequantization unit, an inverse prediction unit, a sorting unit, and a decoding unit. The decoder performs processing in reverse order to processing by the encoder, so as to decompress pixel signals from the coded frequency data.

The details of HD Photo are disclosed in, for example, "HD Photo—Photographic Still Image File Format", [online], 7 Nov. 2006, Microsoft Corporation, [searched in the Internet on 10 Oct. 2007], <URL: http://www.microsoft.com/whdc/xps/hdphotodpk.mspx>. The details of JPEG XR are disclosed in, for example, "Coding of Still Pictures—JBIG JPEG", [online], 19 Dec. 2007, ISO/IEC JTC 1/SC 29/WG1 N 4392, [searched in the Internet on 4 Mar. 2008], <URL: http://www.itscj.ipsj.or.jp/sc29/open/29view/29n9026t.doc>or "Coding of Still Pictures—JBIG JPEG", [online], 14 Sep. 2008, ISO/IEC JTC 1/SC 29/WG1 N 4739, [searched in the Internet on 17 Sep. 2008], <URL: http://www.itscj.ipsj.or.jp/sc29/open/29view/29n9749t.doc>.

The sorting unit refers to a table common to the three color channels, luminance Y, chrominance U, and chrominance V. When processing HP component in YUV444 color space, the sorting unit first performs Adaptive Scan on 16 blocks for luminance Y in sequence while updating a table for each block, secondly performs Adaptive Scan on 16 blocks for chrominance U in sequence while updating a table for each block, and then performs Adaptive Scan on 16 blocks for chrominance V in sequence while updating a table for each block. Thus the sorting unit needs to wait for processing for luminance Y to be completed in order to process chrominance U, and wait for processing for chrominance U to be completed in order to process chrominance V. Consequently, processing time required for sorting is prolonged.

SUMMARY OF THE INVENTION

It is an object of the present invention to provide an image processor that achieves reduced processing time required for sorting by processing multiple color channels in parallel.

An image processor according to an aspect of the present invention includes a first sorting unit that sorts first data of a first color channel based on a first table indicating frequency of appearance of nonzero data corresponding to the first color channel, a second sorting unit that sorts second data of a second color channel based on a second table indicating frequency of appearance of nonzero data corresponding to the second color channel, in parallel with sorting of the first data by the first sorting unit, and a first updating unit that updates the second table based on nonzero information on the first data, before the second sorting unit starts sorting the second data.

Sorting of the first data by the first sorting unit and sorting of the second data by the second sorting unit are performed in parallel. Thus processing time required for sorting is reduced, in comparison to the case where these processings are performed in sequence. Furthermore, the first updating unit updates the second table based on the nonzero information on the first data, before the second sorting unit starts sorting the second data. Thus the second table that the second sorting unit refers to upon sorting the second data appropriately reflects nonzero information of the first data.

Preferably in the image processor, the second sorting unit updates the second table based on nonzero information on the second data after sorting of the second data is completed. The image processor further includes a second updating unit that updates the first table based on the second table that has been updated in the second sorting unit.

The second updating unit updates the first table based on the second table that has been updated in the second sorting unit. Thus the first table that the first sorting unit refers to upon sorting the next first data appropriately reflects nonzero information of the previous second data.

Processing time required for sorting is reduced by processing multiple color channels in parallel.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention are described in detail below referring to the drawings. It should be noted that identical reference numerals throughout the drawings indicate identical or equivalent elements. An example of applying an image processor according to the present invention to an encoder for HD Photo is described in the following description. Application of the image processor, however, is not limited to the same. Furthermore, an example of YUV444 color space is described in the following description. Application of the image processor, however, is not limited to the same.

Figure 1:
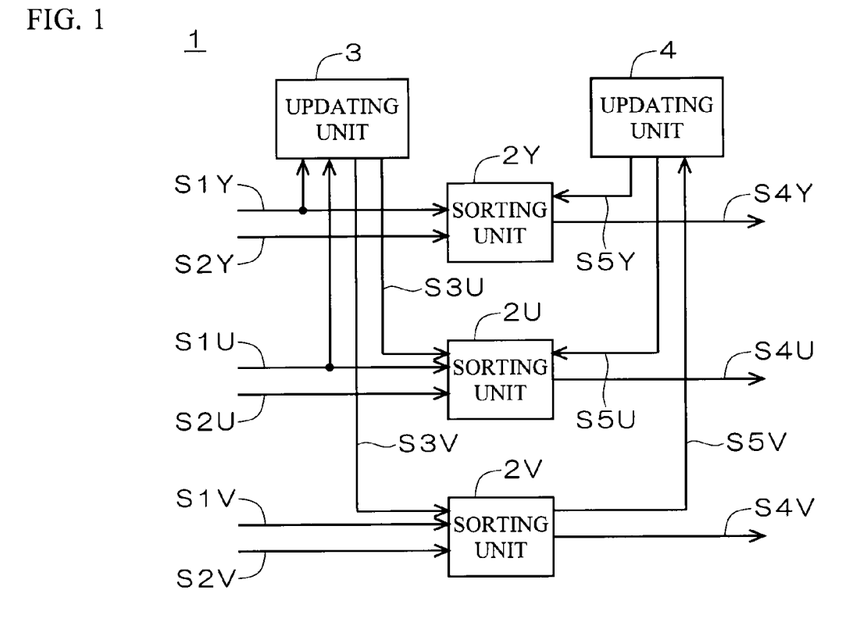
FIG. 1 is a block diagram showing a configuration of a sorting unit as a part of an encoder according to a preferred embodiment of the present invention.

FIG. 1 is a block diagram showing a configuration of a sorting unit 1 as a part of an encoder according to a preferred embodiment of the present invention. As shown in relation of connection in FIG. 1, sorting unit 1 includes a sorting unit 2Y corresponding to a color channel of luminance Y, a sorting unit 2U corresponding to a color channel of chrominance U, a sorting unit 2V corresponding to a color channel of chrominance V, and updating units 3 and 4. The sorting unit 1 is configured as a hardware, and is configured such that circuits equivalent to each of the sorting units 2Y, 2U, and 2V are connected in parallel.

The sorting unit 2Y receives input of frequency data S1Y after prediction and data S2Y indicating an orientation of prediction from a preceding prediction unit (not shown). The sorting unit 2U receives input of frequency data S1U after prediction and data S2U indicating the orientation of prediction from the prediction unit. The sorting unit 2V receives input of frequency data S1V after prediction and data S2V indicating the orientation of prediction from the prediction unit.

The sorting unit 2Y also receives input of update data S5Y from the updating unit 4. The sorting unit 2U receives input of update data S3U from the updating unit 3, and input of update data S5U from the updating unit 4. The sorting unit 2V receives input of update data S3V from the updating unit 3. The updating unit 4 receives input of update data S5V from the sorting unit 2V.

The sorting unit 2Y sorts the frequency data S1Y (Adaptive Scan), so as to output frequency data S4Y after sorting to a subsequent encoding unit (not shown). The sorting unit 2U sorts the frequency data S1U, so as to output frequency data S4U after sorting to the encoding unit. The sorting unit 2V sorts the frequency data S1V, so as to output frequency data S4V after sorting to the encoding unit.

Figure 2:
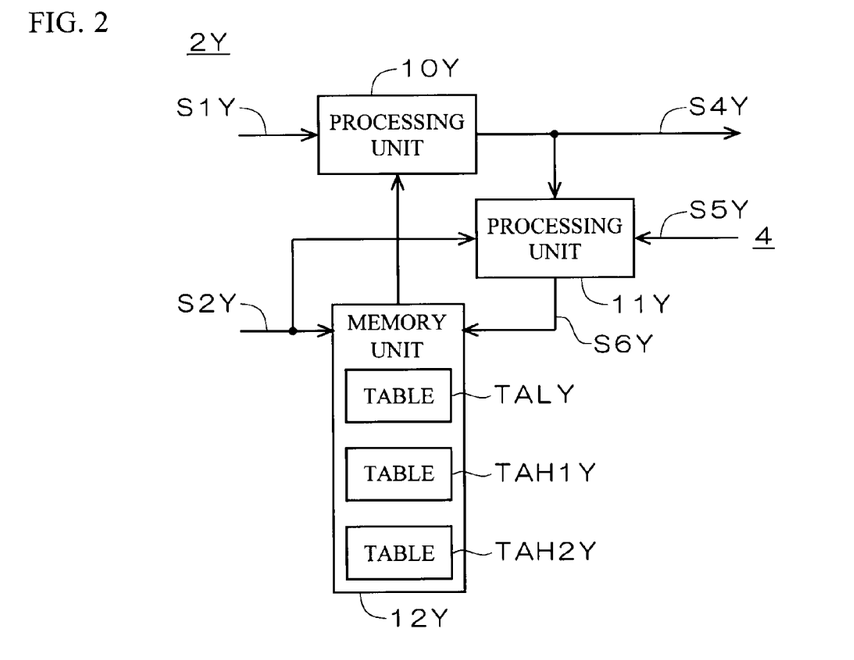
FIG. 2 is a block diagram showing a configuration of a sorting unit.

FIG. 2 is a block diagram showing a configuration of the sorting unit 2Y. As shown in relation of connection in FIG. 2, the sorting unit 2Y includes processing units 10Y and 11Y and a memory unit 12Y. The processing unit 10Y sorts the frequency data S1Y, so as to output the frequency data S4Y. The processing unit 11Y receives input of the data S2Y and the update data S5Y. The processing unit 11Y also receives input of the frequency data S4Y from the processing unit 10Y. As a table which the processing unit 10Y refers to to perform sorting, a table TALY for LP component, a table TAH1Y for HP component when the orientation of prediction is a horizontal direction, and a table TAH2Y for HP component when the orientation of prediction is a vertical direction are stored in the memory unit 12Y.

Figure 3:
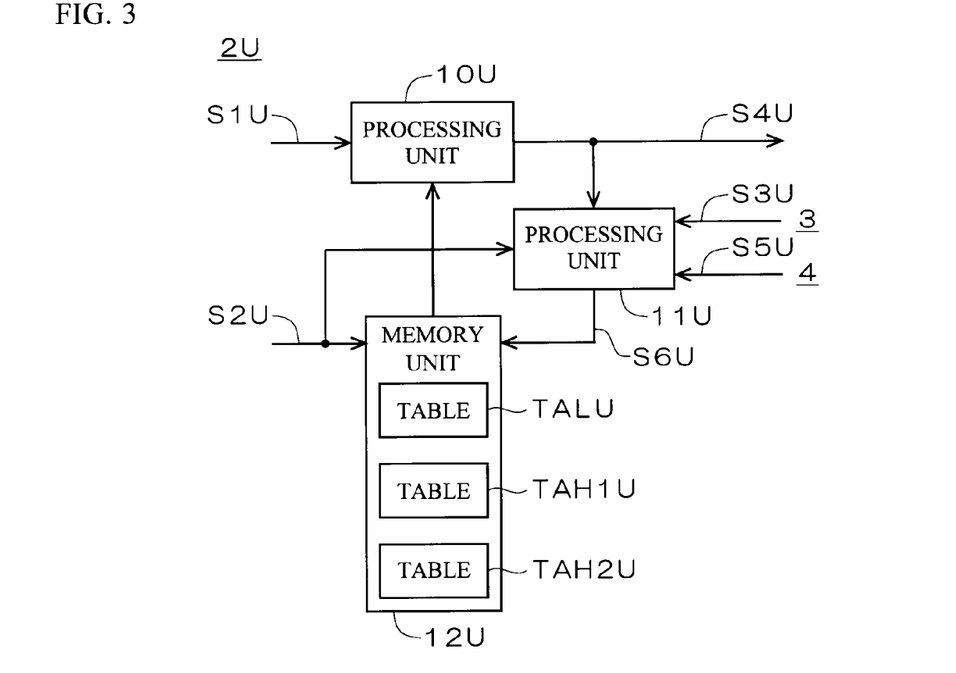
FIG. 3 is a block diagram showing a configuration of a sorting unit.

FIG. 3 is a block diagram showing a configuration of the sorting unit 2U. As shown in relation of connection in FIG. 3, the sorting unit 2U includes processing units 10U and 11U and a memory unit 12U. The processing unit 10U sorts the frequency data S1U, so as to output the frequency data S4U. The processing unit 11U receives input of the data S2U and the update data S3U and S5U. The processing unit 11U also receives input of the frequency data S4U from the processing unit 10U. As a table which the processing unit 10U refers to to perform sorting, a table TALU for LP component, a table TAH1U for HP component when the orientation of prediction is a horizontal direction, and a table TAH2U for HP component when the orientation of prediction is a vertical direction are stored in the memory unit 12U.

Figure 4:
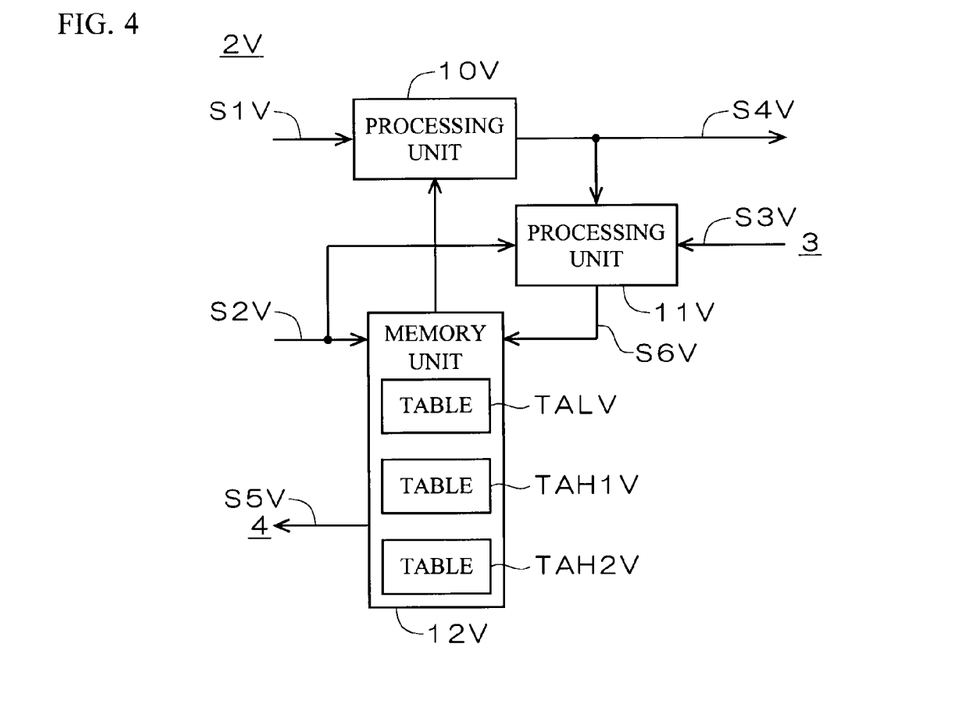
FIG. 4 is a block diagram showing a configuration of a sorting unit.

FIG. 4 is a block diagram showing a configuration of the sorting unit 2V. As shown in relation of connection in FIG. 4, the sorting unit 2V includes processing units 10V and 11V and a memory unit 12V. The processing unit 10V sorts the frequency data S1V, so as to output the frequency data S4V. The processing unit 11V receives input of the data S2V and the update data S3V. The processing unit 11V also receives input of the frequency data S4V from the processing unit 10V. As a table which the processing unit 10V refers to to perform sorting, a table TALV for LP component, a table TAH1V for HP component when the orientation of prediction is a horizontal direction, and a table TAH2V for HP component when the orientation of prediction is a vertical direction are stored in the memory unit 12V.

Details of sorting by sorting unit 2Y are described below as a representative example. Referring to FIG. 2, the processing unit 10Y sorts 15 sets of frequency data of LP component among the inputted frequency data S1Y. The processing unit 10Y also sorts 15 sets of frequency data of HP component among the inputted frequency data S1Y on a block-by-block basis. Specifically, the processing unit 10Y refers to the tables TALY, TAH1Y, and TAH2Y indicating frequency of appearance of nonzero data, and sorts the frequency data S1Y into the order of decreasing frequency of appearance of nonzero data.

Figure 5A:
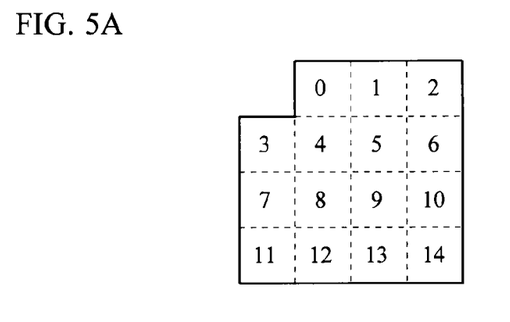
FIGS. 5A to 5C show sorting by a processing unit.
Figure 5B:
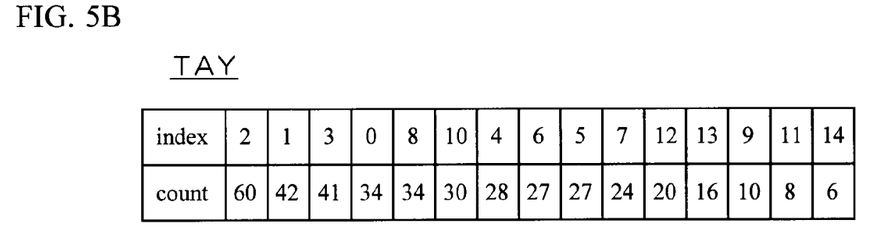
Figure 5C:
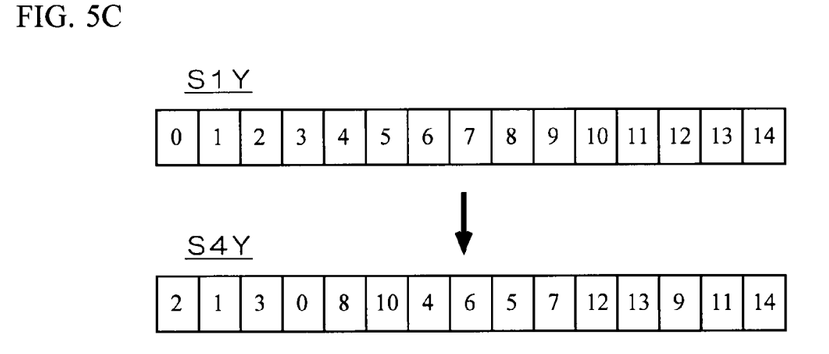

FIGS. 5A to 5C show sorting by the processing unit 10Y. FIG. 5A shows index values assigned to 15 frequency data positions. FIG. 5B shows an example of a table TAY (any one of the tables TALY, TAH1Y, and TAH2Y). FIG. 5C shows 15 sets of frequency data S1Y inputted to the processing unit 10Y and 15 sets of frequency data S4Y outputted from the processing unit 10Y.

Referring to FIG. 5B, in the table TAY, when the value of frequency data in a position corresponding to a certain index value is not zero (i.e., in a case of nonzero data), a count value corresponding to the index value is incremented by "1". Then index values are sorted within the table TAY so that an index value with a smaller count value is positioned behind. Increment of the count value and sorting of the index value within the table TAY are performed by the processing unit 11Y.

Referring to FIG. 5C, the processing unit 10Y receives input of 15 sets of frequency data from the one in the position with the index value "0" in increasing order. The processing unit 10Y sorts the 15 sets of frequency data so that the order of the inputted 15 sets of frequency data coincide with the order of the index value within the table TAY. Thus in the frequency data outputted from the processing unit 10Y, a frequency data set in a position where nonzero data appears less frequently is located behind.

For LP component, there is one table (table TALY shown in FIG. 2) as stated above. For HP component, there are two tables in total, one employed when the orientation of prediction of HP component in the macroblock is a horizontal direction (table TAH1Y), and the other employed in case of a vertical direction (table TAH2Y). When there is no orientation of prediction of HP component (i.e., when prediction is not performed), the table TAH1Y is employed. Selection between the tables TAH1Y and TAH2Y are made based on the data S2Y inputted from the preceding prediction unit.

Prediction by the prediction unit is described below. The prediction unit performs prediction of DC component first, then LP component, and then HP component.

Figure 6:
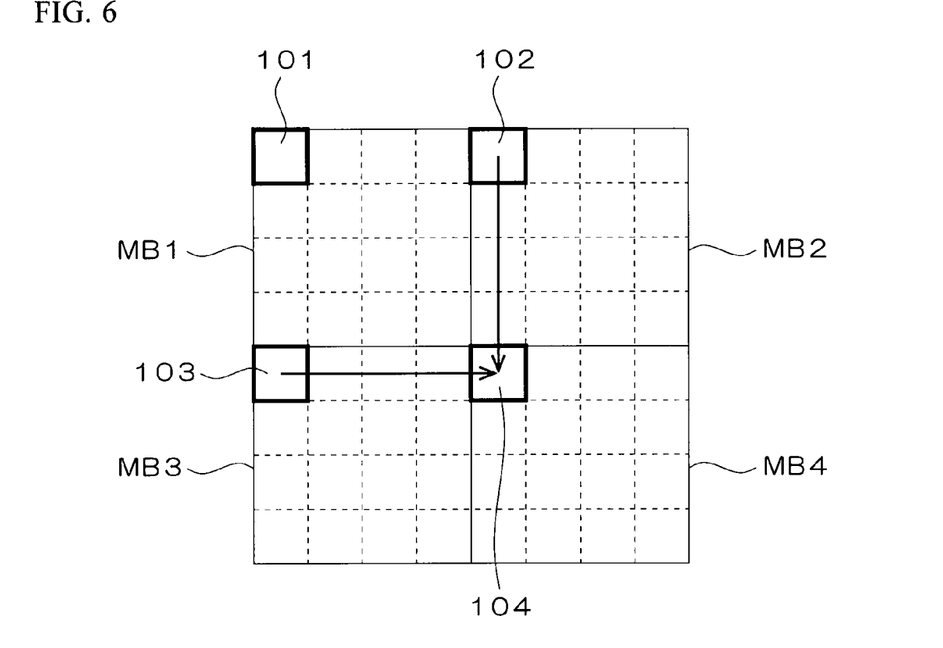
FIG. 6 shows prediction of DC component.

FIG. 6 shows prediction of DC component. Four sets of frequency data 101 to 104 of DC component corresponding to four macroblocks MB1 to MB4 are shown in FIG. 6. Let the currently target frequency data be the frequency data 104 of the macroblock MB4 at the bottom right.

The prediction unit obtains an absolute value of the difference between the frequency data 101 and 103 for each of luminance Y and chrominance U and V, multiplies the absolute value of luminance Y by a predetermined value ("4", for example), and then adds the three absolute values together, so as to obtain an edge determination value in a horizontal direction. Similarly, the prediction unit obtains an absolute value of the difference between the frequency data 101 and 102 for each of luminance Y and chrominance U and V, multiplies the absolute value of luminance Y by a predetermined value ("4", for example), and then adds the three absolute values together, so as to obtain an edge determination value in a vertical direction. Then when the value obtained by multiplying the edge determination value in the horizontal direction by a predetermined value ("4", for example) is smaller than the edge determination value in the vertical direction, the prediction unit decides the orientation of prediction is the vertical direction (upward). In such a case, the prediction value is the value of the frequency data 102. When the value obtained by multiplying the edge determination value in the vertical direction by a predetermined value ("4", for example) is smaller than the edge determination value in the horizontal direction, the prediction unit decides the orientation of prediction is the horizontal direction (leftward). In such a case, the prediction value is the value of the frequency data 103. When neither of the above cases applies, the average value between the values of the frequency data 102 and 103 serves as the prediction value. The prediction unit obtains the frequency data S1Y after prediction as a difference value between the frequency data 104 and the prediction value.

Figure 7:
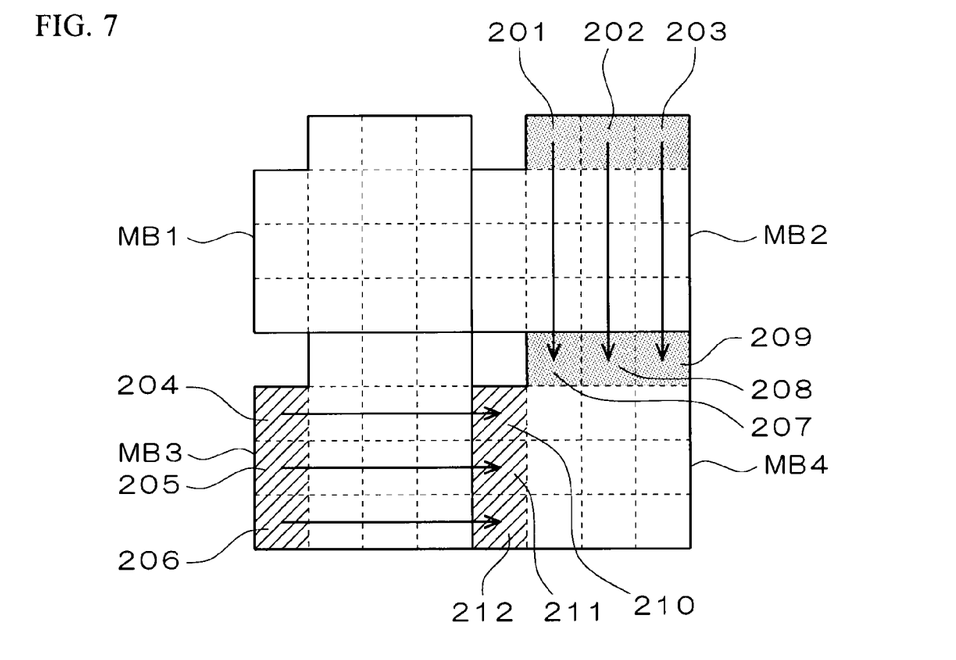
FIG. 7 shows prediction of LP component.

FIG. 7 shows prediction of LP component. A total of 60 sets of frequency data of LP component, corresponding to four macroblocks MB1 to MB4, are shown in FIG. 7 corresponding to FIG. 6. Let the currently target frequency data be the frequency data 207 to 212 of the macroblock MB4 at the bottom right.

When the orientation of prediction of the frequency data 104 of DC component of the macroblock MB4 (see FIG. 6) is upward and the quantization coefficient of LP component of the macroblock MB4 is equal to that of the macroblock MB2, the orientation of prediction is upward. In such a case, the values of the frequency data 201, 202, and 203 respectively serve as the prediction values of the frequency data 207, 208, and 209. The prediction unit respectively obtains the frequency data S1Y after prediction as a difference value between each of the frequency data 207, 208, and 209 and each prediction value. Also in such a case, prediction is not performed on the other 12 sets of frequency data within the macroblock MB4.

When the orientation of prediction of the frequency data 104 of DC component of the macroblock MB4 is leftward and the quantization coefficient of LP component of the macroblock MB4 is equal to that of the macroblock MB3, the orientation of prediction is leftward. In such a case, the values of the frequency data 204, 205, and 206 respectively serve as the prediction values of the frequency data 210, 211, and 212. The prediction unit respectively obtains the frequency data S1Y after prediction as a difference value between each of the frequency data 210, 211, and 212 and each prediction value. Also in such a case, prediction is not performed on the other 12 sets of frequency data within the macroblock MB4.

When neither of the above cases applies, prediction is not performed on any frequency data within the macroblock MB4. That is, the prediction value is zero.

Figure 8:
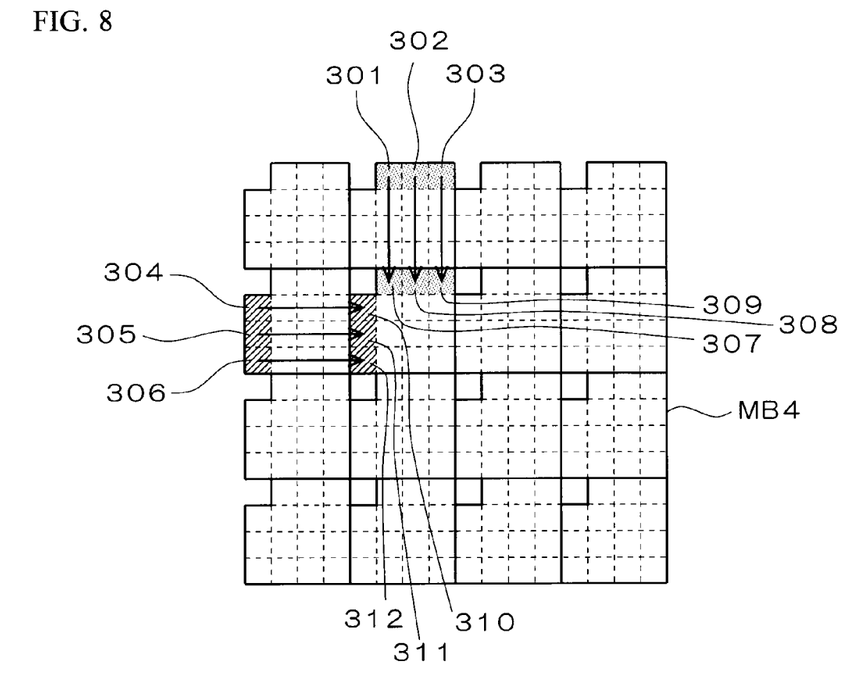
FIG. 8 shows prediction of HP component.

FIG. 8 shows prediction of HP component. A total of 240 sets (15 sets×16 blocks) of frequency data of HP component corresponding to one macroblock MB4 are shown in FIG. 8. Let the currently target frequency data be the frequency data 307 to 312 of the block second from the left and second from the top.

Referring to FIG. 7, the prediction unit adds the values of the frequency data 207 to 209 after prediction for luminance Y and the values of the frequency data 207 after prediction for each of chrominance U and V all together, so as to obtain an edge determination value in a horizontal direction. Similarly, the prediction unit adds the values of the frequency data 210 to 212 after prediction for luminance Y and the values of the frequency data 210 after prediction of each of chrominance U and V all together, so as to obtain an edge determination value in a vertical direction.

When the value obtained by multiplying the edge determination value in the horizontal direction by a predetermined value ("4", for example) is smaller than the edge determination value in the vertical direction, the prediction unit decides the orientation of prediction is leftward. In such a case, referring to FIG. 8, the values of the frequency data 304, 305, and 306 respectively serve as the prediction values of the frequency data 310, 311, and 312. The prediction unit respectively obtains the frequency data S1Y after prediction as a difference value between each of the frequency data 310, 311, and 312 and each prediction value. Also in such a case, prediction is not performed on the other 12 sets of frequency data within the same block. When the value obtained by multiplying the edge determination value in the vertical direction by a predetermined value ("4", for example) is smaller than the edge determination value in the horizontal direction, the prediction unit decides the orientation of prediction is upward. In such a case, the values of the frequency data 301, 302, and 303 respectively serve as the prediction values of the frequency data 307, 308, and 309. The prediction unit respectively obtains the frequency data S1Y after prediction as a difference value between each of the frequency data 307, 308, and 309 and each prediction value. Also in such a case, prediction is not performed on the other 12 sets of frequency data within the same block.

When neither of the above cases applies, the prediction unit does not perform prediction on any frequency data within the same block. That is, the prediction value is zero.

Figure 9:
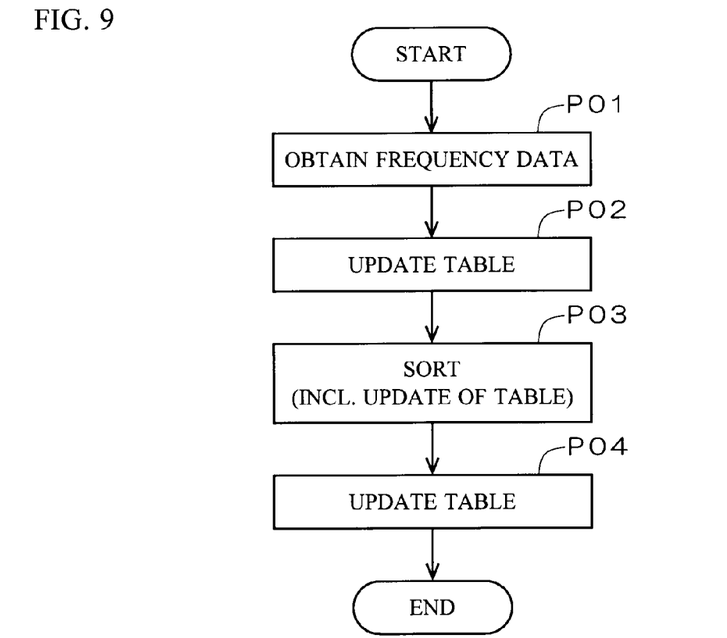
FIG. 9 is a flowchart showing the flow of processing performed by the sorting unit.

Operation of the sorting unit 1 according to the present embodiment is described below. FIG. 9 is a flowchart showing the flow of processing performed by the sorting unit 1.

Sorting of frequency data of LP component is first described.

In Step P01, each of the 15 sets of frequency data S1Y, S1U, and S1V of LP component are respectively inputted to the sorting units 2Y, 2U, and 2V. The frequency data S1Y and S1U are also inputted to the updating unit 3, and thus the updating unit 3 obtains the frequency data S1Y and S1U.

Next in Step P02, the updating unit 3 inputs nonzero information on the obtained 15 sets of frequency data S1Y to the sorting unit 2U as the update data S3U. Here, "nonzero information" means information representing whether or not each value of 15 sets of frequency data is zero. Referring to FIG. 3, the update data S3U is inputted to the processing unit 11U. The processing unit 11U updates the table TALU based on the update data S3U. Specifically, among the 15 index values in the table TALU stored in the memory unit 12U, the processing unit 11U increments all the count values corresponding to the index values of nonzero data in the frequency data S1Y by "1".

Similarly in Step P02, the updating unit 3 inputs nonzero information on each of the obtained 15 sets of frequency data S1Y and S1U to the sorting unit 2V as the update data S3V. Referring to FIG. 4, the update data S3V is inputted to the processing unit 11V. The processing unit 11V updates the table TALV based on the update data S3V. Specifically, among the 15 index values in the table TALV stored in the memory unit 12V, the processing unit 11V increments all the count values corresponding to the index values of nonzero data in the frequency data S1Y by "1", and also increments all the count values corresponding to the index values of nonzero data in the frequency data S1U by "1".

Next in Step P03, the sorting units 2Y, 2U, and 2V respectively sorts the frequency data S1Y, S1U, and S1V. Specifically, referring to FIGS. 2, 3, and 4, the processing units 10Y, 10U, and 10V respectively refers to the tables TALY, TALU, and TALV, and respectively sorts the 15 sets of frequency data S1Y, S1U, and S1V. Thereby, the frequency data S4Y, S4U, and S4V after sorting has been completed are respectively outputted from the processing units 10Y, 10U, and 10V.

Also in Step P03, the processing units 11Y, 11U, and 11V respectively update the tables TALY, TALU, and TALV based on the frequency data S4Y, S4U, and S4V respectively inputted from the processing units 10Y, 10U, and 10V. Specifically, among the 15 index values in each of the tables TALY, TALU, and TALV, the processing units 11Y, 11U, and 11V respectively increment all the count values corresponding to the index values of nonzero data in the frequency data S4Y, S4U, and S4V by "1".

Next in Step P04, the updating unit 4 updates the tables TALY and TALU for luminance Y and chrominance U, based on the table TALV for chrominance V. Referring to FIGS. 1 and 4, the updating unit 4 reads data of the index values and the count values in the table TALV as the update data S5V from the memory unit 12V. Then, referring to FIGS. 1 to 3, the updating unit 4 inputs the update data S5V read from the memory unit 12V to the processing units 11Y and 11U respectively as the update data S5Y and S5U. The processing units 11Y and 11U respectively update the tables TALY and TALU based on the update data S5Y and S5U. That is, the index values and the count values in each of the tables TALY and TALU are replaced with those in the table TALV.

Sorting of frequency data of HP component is then described.

In Step P01, each of the 15 sets×16 blocks of frequency data S1Y, S1U, and S1V of HP component and the data S2Y, S2U, and S2V indicating the orientation of prediction of HP component are respectively inputted to the sorting units 2Y, 2U, and 2V. The frequency data S1Y and S1U are also inputted to the updating unit 3, and thus the updating unit 3 obtains the frequency data S1Y and S1U.

Next in Step P02, the updating unit 3 inputs nonzero information on the obtained 15 sets×16 blocks of frequency data S1Y to the sorting unit 2U as the update data S3U. Referring to FIG. 3, the update data S3U is inputted to the processing unit 11U. Among the 15 index values in the table TAH or TAH2U selected by the data S2U, the processing unit 11U increments all the count values corresponding to the index values of nonzero data in the frequency data S1Y by "1".

Similarly in Step P02, the updating unit 3 inputs nonzero information on each of the obtained 15 sets×16 blocks of frequency data S1Y and S1U to the sorting unit 2V as the update data S3V. Referring to FIG. 4, the update data S3V is inputted to the processing unit 11V. Among the 15 index values in the table TAH1V or TAH2V selected by the data S2V, the processing unit 11V increments all the count values corresponding to the index values of nonzero data in the frequency data S1Y by "1", and also increments all the count values corresponding to the index values of nonzero data in the frequency data S1U by "1".

Next in Step P03, the sorting units 2Y, 2U, and 2V respectively sorts the frequency data S1Y, S1U, and S1V. Specifically, referring to FIGS. 2, 3, and 4, the processing units 10Y, 10U, and 10V respectively refer to the tables TAH1Y or TAH2Y, TAH1U or TAH2U, and TAH or TAH2V, and respectively sort the 15 sets×16 blocks of frequency data S1Y, S1U, and S1V. Thereby, the frequency data S4Y, S4U, and S4V after sorting has been completed are respectively outputted from the processing units 10Y, 10U, and 10V.

Also in Step P03, the processing units 11Y, 11U, and 11V respectively update the tables TAH1Y or TAH2Y, TAH or TAH2U, and TAH or TAH2V based on the frequency data S4Y, S4U, and S4V respectively inputted from the processing units 10Y, 10U, and 10V. Specifically, among the 15 index values in each of the tables TAH1Y or TAH2Y, TAH or TAH2U, and TAH or TAH2V, the processing units 11Y, 11U, and 11V respectively increment all the count values corresponding to the index values of nonzero data in the frequency data S4Y, S4U, and S4V by "1".

Next in Step P04, the updating unit 4 respectively updates the tables TAH1Y or TAH2Y, and TAH1U or TAH2U for luminance Y and chrominance U, based on the table TAH1V or TAH2V for chrominance V. Referring to FIGS. 1 and 4, the updating unit 4 reads data of the index values and the count values in the table TAH or TAH2V as the update data S5V from the memory unit 12V. Then, referring to FIGS. 1 to 3, the updating unit 4 inputs the update data S5V read from the memory unit 12V to the processing units 11Y and 11U respectively as the update data S5Y and S5U. The processing units 11Y and 11U respectively update the tables TAH1Y or TAH2Y and TAH or TAH2U based on the update data S5Y and S5U. That is, the index values and the count values in each of the tables TAH1Y or TAH2Y and TAH1U or TAH2U are replaced with those in the table TAH1V or TAH2V.

As described above, the sorting unit 1 according to the present embodiment performs sorting of the frequency data S1Y by the sorting unit 2Y, sorting of the frequency data S1U by the sorting unit 2U, and sorting of the frequency data S1V by the sorting unit 2V in parallel. Thus processing time required for sorting is reduced, in comparison to the case where these processings are performed in sequence.

Furthermore, the updating unit 3 updates the tables TALU, TALV, TAH1U or TAH2U, and TAH1V or TAH2V based on the nonzero information on the frequency data S1Y and S1U, before the sorting units 2U and 2V start sorting. Thus tables that the sorting units 2U and 2V refer to upon sorting the frequency data S1U and S1V appropriately reflect nonzero information of the frequency data S1Y and S1U.

Moreover, the updating unit 4 updates the tables TALY, TALU, TAH1Y or TAH2Y, and TAH1U or TAH2U, based on the tables TALV and TAH1V or TAH2V that have been updated in the sorting unit 2V. Thus tables that the sorting units 2Y and 2U refer to upon sorting the next frequency data S1Y and S1U appropriately reflect nonzero information of the previous frequency data S4V.

In the above embodiment, an example of the sorting unit 2Y internally having the tables TALY, TAH1Y, and TAH2Y, the sorting unit 2U internally having the tables TALU, TAH1U, and TAH2U, and the sorting unit 2V internally having the tables TALV, TAH1V, and TAH2V is described. However, the present invention is not limited to this example but these tables may be provided externally to the sorting units 2Y, 2U, and 2V.

Furthermore, in the above embodiment, an example of applying the present invention to an encoder for HD Photo is described. However, the present invention is not limited to this example, but is applicable to a decoder for HD Photo, as well. In such a case, the frequency data S1Y, S1U, and S1V are inputted from a preceding decoding unit to the sorting unit 1, and the data S2Y, S2U, and S2V indicating the orientation of prediction are inputted from a subsequent inverse prediction unit to the sorting unit 1. The frequency data S4Y, S4U, and S4V are outputted from the sorting unit 1 to the subsequent inverse prediction unit.

While the invention has been described in detail, the foregoing description is in all aspects illustrative and not restrictive. It is understood that numerous other modifications and variations can be devised without departing from the scope of the invention.

What is claimed is:

1. An image processor comprising:
a first sorting unit that sorts first data of a first color channel based on a first table indicating frequency of appearance of nonzero data corresponding to the first color channel;
a second sorting unit that sorts second data of a second color channel based on a second table indicating frequency of appearance of nonzero data corresponding to the second color channel, in parallel with sorting of the first data by the first sorting unit; and
a first updating unit that updates the second table based on nonzero information on the first data, before the second sorting unit starts sorting the second data.

2. The image processor according to claim 1, wherein the second sorting unit updates the second table based on nonzero information on the second data after sorting of the second data is completed,
the image processor further comprising;
a second updating unit that updates the first table based on the second table that has been updated in the second sorting unit.

3. The image data processor according to claim 1, wherein the first sorting unit, the second sorting unit, and the first updating unit are implemented as hardware.

4. The image data processor according to claim 3, wherein the first sorting unit and the second sorting unit are circuits.

5. The image data processor according to claim 1, wherein the nonzero information is defined by a number of occurrences of nonzero data in positions of index values assigned to frequency data positions.

6. The image data processor according to claim 1, wherein the first color channel is defined by a luminance, and the second color channel is defined by a chrominance.

7. An image processor comprising:
first means for sorting first data of a first color channel based on a first table indicating frequency of appearance of nonzero data corresponding to the first color channel; and
second means for sorting second data of a second color channel based on a second table indicating frequency of appearance of nonzero data corresponding to the second color channel, in parallel with sorting of the first data by the first means for sorting, wherein the second table is updated based on nonzero information on the first data, before the second means for sorting starts sorting the second data.

8. A method comprising:
sorting first data of a first color channel based on a first table indicating frequency of appearance of nonzero data corresponding to the first color channel;
sorting second data of a second color channel based on a second table indicating frequency of appearance of nonzero data corresponding to the second color channel, in parallel with the sorting the first data; and
updating the second table based on nonzero information on the first data, before the sorting the second data.

* * * * *